United States Patent [19]
Rygiol

[11] 3,781,511
[45] Dec. 25, 1973

[54] METHOD OF WELDING EMPLOYING SQUARE WAVE CURRENT PULSES AND CAUSING THE MOLTEN METAL TO RESONATE

[76] Inventor: Henry V. Rygiol, 3146 Perrer Rd., Escondido, Calif. 92025

[22] Filed: Mar. 23, 1972

[21] Appl. No.: 237,452

[52] U.S. Cl.................. 219/137, 219/130, 219/135
[51] Int. Cl............................................... B23k 9/10
[58] Field of Search................ 219/137, 135, 131 R, 219/131 WR, 130

[56] References Cited
UNITED STATES PATENTS

| | | | |
|---|---|---|---|
| 3,182,178 | 5/1965 | Libby................................. | 219/130 |
| 3,382,345 | 5/1968 | Normando....................... | 219/135 X |
| 3,487,195 | 12/1969 | Denis et al...................... | 219/137 X |
| 3,538,301 | 11/1970 | Bray et al. ........................ | 219/137 |
| 3,330,933 | 7/1967 | Maklary............................. | 219/135 |
| 3,614,378 | 10/1971 | Goodell ............................ | 219/137 |

Primary Examiner—Bruce A. Reynolds
Attorney—Edward D. O'Brian

[57] ABSTRACT

The metal structure within a weld area may be altered to obtain desirable physical properties by applying an arc to the weld area and pulsing the current supplied to the arc in several different manners so that the electron flow resulting from the operation of the arc causes the molten metal in the weld area to resonate. Preferably the current used consists of repetitive, sequential current "units" of two different series of sequential welding pulses, the first of such "units" consisting of a series of pulses of a square wave form varying between first and second current levels and the second of such "units" consisting of a series of current pulses of substantially a square wave form varying between either the second or a third level and a fourth current level. Various metals and alloys which are difficult and/or substantially impossible to weld by established techniques can be welded utilizing a weld current consisting of such "units."

5 Claims, 7 Drawing Figures

METHOD OF WELDING EMPLOYING SQUARE WAVE CURRENT PULSES AND CAUSING THE MOLTEN METAL TO RESONATE

BACKGROUND OF THE INVENTION

For many years it has been common to utilize an electric arc created utilizing a current of a constant or substantially constant amperage in welding metals together. The welding art has long recognized that there are limitations to the use of welding arcs utilizing a constant or substantially constant current level. An understanding of the present invention is not considered to require a detailed discussion of what has been well-known with respect to the use of such arcs. With such arcs it has frequently been difficult and/or impossible to satisfactorily weld certain metals and alloys and it is well recognized that welds created utilizing such arcs frequently do not have desired physical properties.

As a result of these and various other factors various techniques have been proposed to improve the welds obtainable through the use of electric arcs. Perhaps the most successful of these techniques involves what is commonly referred to as "pulsed arc welding." Pulsed arc welding processes are effectively described in a number of different areas of the appropriate technical literature. In order to supplement this disclosure as to this type of prior art technique reference is made to the publication entitled "*Pulsed-Current Arc Welding Processes*" designated as the "*DMIC Memorandum 250*" dated September 1970, published by the *Defense Metals Information Center, Battelle Memorial Institute, Columbus, Ohio 43201* which is obtainable from the *Clearing House for Federal and Scientific and Technical Information, U.S. Department of Commerce, Springfield, Virginia 22151*. The entire disclosure of this publication is incorporated herein by reference.

This publication and other materials indicate that pulsed arc welding in effect produces a continuously welded area or seam which may be regarded as a series of overlapping arc spot welds through the use of pulses of a welding current. In such techniques these pulses consist of a repetitive series of current pulses of a relatively low current level and current pulses at a higher or relatively higher current level. It is normally intended that the power supply used in pulsed arc welding will deliver these current pulses so that they have a substantially square wave form. Because of the nature of the cables utilized to deliver power to welding electrodes it is realized that the current pulses actually delivered to such electrodes through normal welding cables do not have the current form of the currents supplied by the usual power supplies used in pulsed arc welding.

It has been recognized that pulsed arc welding is desirable in improving weld quality and in improving weld metal deposition and in improving control of the so-called "welding heat." Pulsed arc welding is often considered desirable because it allows the heat supplied to penetrate significantly into the metal being welded and because it tends to make possible the achievement of comparatively narrow weld beads. It has been recognized that pulsed arc welding tends to agitate the molten metal in a weld area so as to tend to lower inclusions within the welded metal and so as to tend to reduce the porosity of a weld area.

As a result of these and other aspects of pulsed arc welding this pulsed arc type of welding is considered to offer certain advantages for welding materials that may not be metallurgic tolerant of comparatively high welding heat input rates. It is considered that pulsed current arc welding processes are desirable in that they have been used to create useable welds with metals which could not be satisfactorily welded utilizing conventional prior welding currents and processes.

In spite of the desirability of pulsed arc welding processes there has, however, remained a definite distinct need for new and improved welding techniques. This need has been particularly manifested in a desire for techniques to create satisfactory welds between metals and alloys which have not been satisfactorily welded utilizing procedures such as are indicated in the preceding discussion. Also, in spite of the advantages of pulsed arc welding techniques to produce welds of a better physical quality than are obtainable by this and other prior procedures. Further, there is need for new and improved welding techniques which can be satisfactorily controlled during welding operations.

SUMMARY OF THE INVENTION

A broad objective of the present invention is to provide new and improved welding techniques which meet or tend to meet these and various related needs in the industry. A related objective of the invention is to provide techniques or methods as indicated: which can be easily and conveniently utilized; which produce "better" weld than prior processes such as are briefly indicated in the preceding and other related processes; and which can be satisfactorily utilized in creating desirable welds with metals and alloys which have been previously considered as being hard or substantially impossible to weld.

The invention set forth in this specification is in addition directed in its more specific aspects to improving metal structures, and in particular the internal structure of a metal which will result in a weld area from the creation of a weld. However, an internal metal structure as created in accordance with this invention is considered not only to be useful or desirable in a weld. It is considered that the basic concepts of this invention pertaining to internal metal structures as herein described can be utilized in complete metal members such as in a complete rod or the like which is separate and apart from the weld area between two metal members.

In accordance with this invention the various objectives of it and other objectives as will be apparent from a detailed consideration of the remainder of this specification are achieved by melting metal using an electric arc created with a current consisting of repetitive, sequential "units" or pulses of such a character that these "units" or pulses result in an electron flow which causes molten metal placed in a liquid form through the arc operation to resonate. Such resonance as referred to herein is a form of mechanical resonance analogous to the resonance of a tone bar in a musical instrument or the like.

Preferably the current utilized as indicated in the preceding consists of repetitive, sequential current pulses or "units" of two different series of sequential current pulses. The first of such "units" or pulses preferably consists of a series of current pulses of a substantially square wave form varying between first and second current levels. The second of such "units" or pulses preferably consists of another series of current pulses of a substantially square wave form varying between a second or a third current level and a fourth current level.

BRIEF DESCRIPTION OF THE DRAWINGS

Because of its brevity a summary of this type is inherently incapable of fully indicating many aspects and features of an invention which are significant to the invention itself and to an understanding of it. The present invention is best more fully explained with reference to the remainder of this specification, the appended claims and the accompanying drawings in which:

From the preceding it will be realized that the invention set forth in this specification involves a variety of different essentially intangible concepts. Such concepts are set forth and defined in the appended claims. On the basis of the disclosure embodied within this specification those skilled in the arts of welding and of metallurgey will be able to utilize these concepts in many different ways in creating metal structures as herein described and in various different welding operations.

DETAILED DESCRIPTION

Known or mechanical equipment such as now presently employed for so-called "pulsed arc welding" may be employed in welding in accordance with the disclosure of this specification. For various operations other than welding such as creating a sheet or bar of metal having an internal structure as herein indicated, various different types of mechanical equipment are, of course, employed. Such other types of mechanical equipment can be readily designed so as to include the essential mechanical elements commonly utilized in pulsed arc welding.

Although the mechanical equipment used with the present invention will normally be the same as or on the order of known mechanical equipment, the power supply used in practicing the invention disclosed will normally be significantly different from the power supply utilized in practicing pulsed arc welding. Preferably the power supply employed will be constructed so as to be capable of providing a current consisting of repetitive, sequential current "units" such as the units A shown in FIG. 1 of the drawings which are alternated with other repetitive, sequential current "units" such as the current units B shown in this same figure of the drawings.

Figure 1:
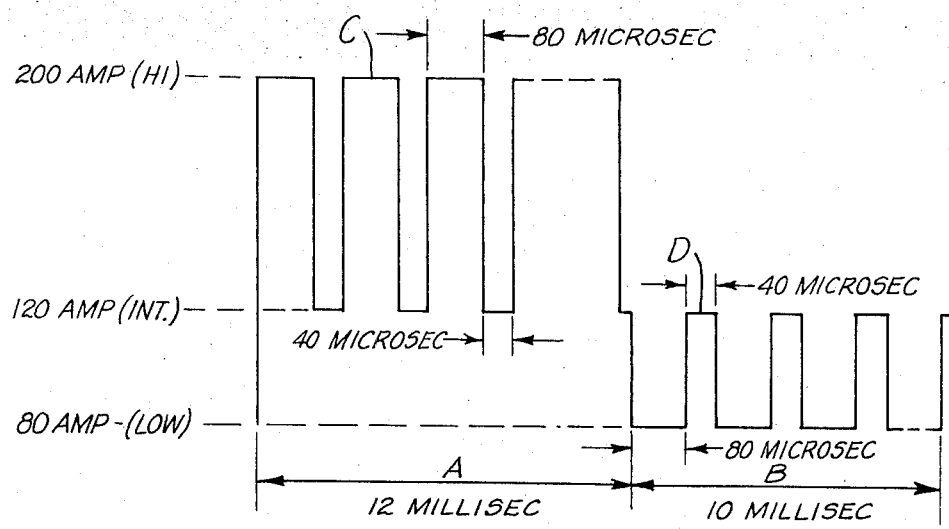
FIG. 1 is a curve showing a welding current used in welding two aluminum parts.

From a consideration of FIG. 1 of the drawings it will be realized that these units A and B correspond to a limited degree to what may be referred to as "current pulses" which are roughly analogous or related to the pulses such as are utilized in conventional pulsed arc welding. These individual units may be referred to as pulses, although in fact they are constituted by a plurality or series of separate current pulses as are hereinafter indicated.

Preferably these current units are used at various time intervals corresponding to those intervals at which current pulses are used in pulsed arc welding. In general, there should be from about 50 to about 500 of these units per second in order to obtain the advantageous results of the present invention. The use of units at the frequencies indicated is considered to be related to known factors such as are involved with pulsed arc welding in that if units of these frequencies are employed the invention retains the known advantages of pulsed arc welding such as are indicated in a preceding portion of this specification.

If, however, these units or pulses are at lower or higher frequencies than those indicated there is the tendency not to achieve these known advantages of pulsed arc welding. It will be realized that as with pulsed arc welding best results are achieved for certain welding applications utilizing specific ranges of frequencies within the broad range indicated. It will, also, be realized that the range indicated marks the limitations of the range within which it is normally considered possible to obtain the advantages of pulsed arc welding, but that some of these same advantages can be achieved somewhat outside of these ranges.

The present invention differs from pulsed arc welding in that these so-called units corresponding to the pulses in this known type of welding are broken up into individual current pulses which vary between two levels at relatively small time durations. Thus, both the units A and B are broken up into individual pulses C and D, each of which varies between two different current levels. In accordance with the present invention the frequency of these pulses C and D can vary within a comparatively wide range.

It is considered that satisfactory results can be achieved when the frequencies of these pulses C and D are within the range of from 5,000 to 50,000 cycles or pulses per second. In general, if the frequency of these pulses C or D is less than about 5,000 cycles or pulses per second the beneficial results of the present invention are not achieved. Similarly, if the frequency of these pulses C or D is greater than the 50,000 figure indicated it is considered that as a general rule satisfactory results are not obtained. In general these numerical values are not considered to be precise limits in that on occasion to at least a degree satisfactory results can be obtained with frequencies which approximate the high and low values indicated, but which are slightly outside the range given.

These results are also related to the wave forms of the pulses C and D. In FIG. 1 of the drawings these pulses are shown as being of a square wave form. Such a square wave form in the current delivered to the welding electrodes in practicing the present invention in welding is considered to be important in achieving desired results. When current is supplied to an electrode as shown by FIG. 1 in effect small "bursts" of electrons are delivered to the weld area. Such bursts are considered to be important in obtaining the desired resonance in the weld area to achieve the results of the invention.

These bursts can roughly be compared with repeated physical blows delivered to a plate of metal in such a manner as to cause continued reinforcement of resonance set up in the plate by the blow.

If there is any significant departure from the square wave form of the current pulses, apparently the bursts of electrons in the weld area to not provide the essential mechanical effect necessary to achieve the results of the present invention. Because of the inherent limitations of electronics it may on occasion be impossible to obtain an exact square wave form for the pulses C and D. It is considered that any significant variation from this wave form will not provide the desired results with the invention.

This wave form of the current delivered at a weld area is related to the manner in which current is carried or conveyed by conventional welding cables from a power supply to an electrode in a weld area. It is well-known that conventional cables as used in pulsed arc welding are normally incapable of delivering pulses of a square wave form to a welding electrode. This is particularly the case when efforts are made to utilize comparatively high frequencies in pulsed arc welding. In general the higher the frequency the greater the deviation from a square wave current form in the current delivered to an electrode in pulsed arc welding. The reasons for this are considered to be substantially immaterial as far as an understanding of the present invention is concerned.

With the present invention the square wave current pulses are delivered to the welding electrode even though what may be considered as very high pulse frequencies are used. This is accomplished with an appropriate power supply as subsequently indicated and by regulating the units A and B so that the pulses C and D within these units vary between two different current levels as indicated in FIG. 1 of the drawings. Thus, from an examination of this figure it will be seen that the pulses C vary between first and second current levels and that the pulses D vary between second and third current levels. It will be noted that these first and third current levels approximately correspond to the difference in the current levels of the current pulses used with conventional pulsed arc welding so as to facilitate retaining the advantages of this type of welding with the invention.

By breaking up the current units A and B as described into current pulses C and D it is possible to "compensate" for the inherent high frequency electrical transmission characteristics of welding cables and the like such as are utilized to convey the current in conventional or known welding processes so that the current form as delivered to the weld area consists of individual square wave pulses such as the pulses C and D. Presumably such pulses can be obtained at a weld area by utilizing various power transmission equipment which can be roughly classified as "exotic" in nature without utilizing current units consisting of current pulses varying between different current levels in amplitude. The use of such "exotic" transmission means is considered undesirable because of the nature of the welding industry and the conventional equipment utilized in it.

This use of current units consisting of current pulses in each of the units of differing amplitude is considered to also be significant in providing for satisfactory welding producing satisfactory metal structures. The reasons for this are not completely understood, but are considered to relate to the fact that the individual pulses within these units are repeatedly utilized for a sufficient time to create a desired essentially mechanical effect on the molten metal within a weld area to obtain beneficial results.

The amplitudes of the individual pulses C and D need not vary between three levels as shown in FIG. 1 of the drawings. This use of three levels is considered advantageous in simplifying the power supply employed. Satisfactory results can and in some cases be obtained by using first current pulses C and D varying between first and second current levels and second current pulses D varying between entirely different current levels. The ranges of the amplitudes of the pulses C and D can be entirely dissimilar and they may or may not overlap if desired.

In any particular application the time duration or frequency of the individual current units A and B, the time duration or frequency of the pulses C and D and the current levels of these pulses (and these units) will be carried depending upon the specific nature of a welding or other operation so that what may be regarded as a mechanical resonance may be set up in a weld area, and in particular in a molten metal of this weld area. The precise frequencies and current levels necessary to set up this resonance will be governed primarily by essentially physical-type factors or mechanical-type factors. In effect these variances have to be adjusted for any particular application in accordance with the metals being welded and the precise geometry of the welding equipment utilized and the parts being welded so that mechanical type resonance will be achieved in the weld area. When such resonance is achieved through variation of the welding current employed and this current is "stabilized" so as to maintain this resonance parts can be welded in accordance with conventional procedures. As an aid to understanding the invention FIGS. 1 and 4 of the drawings indicate the specific values of two different welding currents which have been utilized in obtaining welds in accordance with this invention and the subsequent FIGS. 2 and 3 and 5 and 6, respectively, indicate the nature of the internal metal structures resulting from these welds.

From an examination of FIG. 1 it will be seen that the welding current utilized in welding an aluminum A-13 metal casting to an aluminum 3004H14 plate varies between the current levels of 80, 120 and 200 amperes, and that the individual current units A and B were 12 and 10 milliseconds duration, respectively, and that the individual current pulses C and D were of 80 and 40 microseconds duration, respectively. From an examination of FIG. 4 it will be seen that the welding current utilized in welding two Inconel 600 plates together varies between current levels of 40, 70 and 130 amperes, that the individual units A and B were of 80 and 40 microseconds duration, respectively, and that the individual pulses C and D were of 62 and 39 microseconds duration, respectively.

Figure 4:
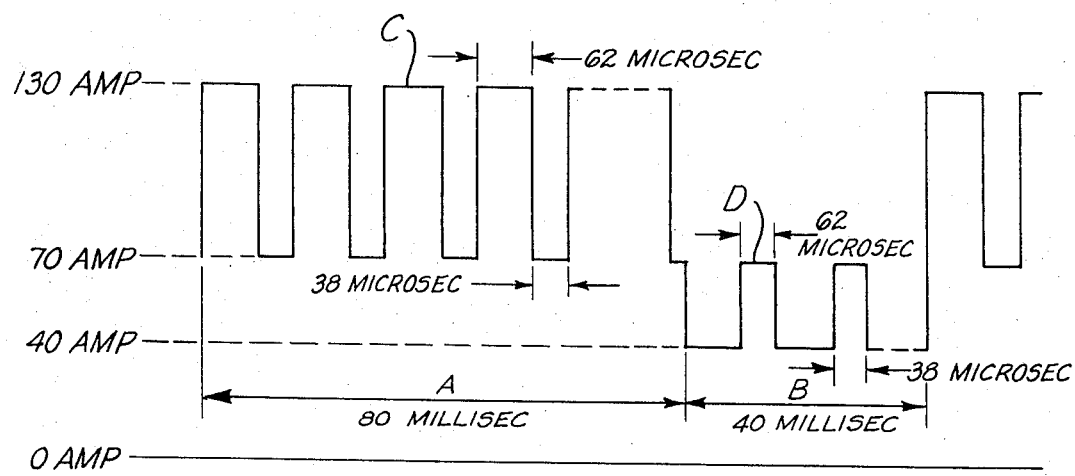
FIG. 4 is a curve showing a welding current used in welding two sheets of an Inconel 600 metal alloy together.
Figure 2:
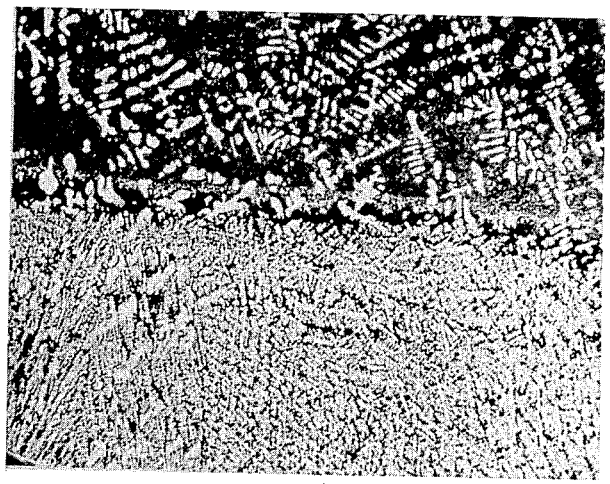
FIG. 2 is a photomicrograph at 100 times magnification showing the metal structure of part of the weld obtained using the current set forth in FIG. 1.
Figure 3:
FIG 3 is a photomicrograph at 100 times magnification showing the metal structure of part of the weld obtained using the current set forth in FIG. 1.

The welds obtained utilizing these welding currents were obtained without the use of filler materials. These welds were made utilizing conventional pulsed arc welding equipment which differs from conventional pulsed arc welding equipment solely in the nature of the power supply circuits utilized to supply currents to the welding cables used. In both cases conventional welding techniques—including inert gas coverage— were used. Both FIGS. 1 and 4 are considered to point up the point that in accordance with this invention both the amplitudes of the current units employed and the time durations of these units and of the pulses used are to be varied from application to application in order to obtain the desired resonance in the weld area leading to a metal structure as herein indicated.

From an examination of FIGS. 2 and 3 and 5 and 6 of the drawings it will be seen that the metal which has been melted and then solidified in making welds as described is significantly different from the metal utilized in creating these welds. It is believed that it will be apparent from these figures that this melted and then solidified metal differs from the initial structures of the metals used in that it is characterized by containing closely packed, substantially parallel needle or rod-like appearing apparently crystaline structures extending into and along the weld area from the interface between the unmelted material and the metal which has been melted and then solidified. These rod-like structures appear to be held in a non-crystaline matrix which is believed to be of an amorphous type character so that they are stablized against movement and secured together.

It will be realized that this manner of definition is essentially based upon physical observation. Because of this and because of the nature of the structures involved from melting and solidifying metal in accordance with this invention it is difficult if not impossible to completely and accurately describe these metal structures. From an observation of them it is believed that they can be directly compared with structures in other fields such as in the reinforced plastics field where a plurality of so-called fiberglass fibers are closely packed so as to extend to at least a large degree parallel to one another in which these fibers are held in place by a polymeric material serving to bind them together.

The needle-like structures within an internal metal structure created in accordance with this invention are significant in that adjacent to the center of the weld area where maximum heat is developed from the use of a welding electrode these needle-like structures tend to be oriented so as to extend parallel to one another generally along the direction in which the welding electrode is moved in making the weld. In the "fringe" areas of the weld adjacent to the materials being welded where the heat from the arc used is less than at the center of the weld area these same needle-like structures tend to be oriented in planes transverse to the direction of the welding electrode movement. In these same fringe areas these needle-like structures tend to be oriented together in groups in regions corresponding to regions or areas of a base metal which are believed to be classified as domains.

In general, the further from the edge of the material which is melted during welding towards the center of the weld area the greater the degree to which these domains or regions containing parallel rod-like structures extending outwardly from the unwelded metal tend to merge or blend with one another and tend to be orientated in the same direction. In all cases the needle-like structures are closely packed together.

Figure 5:
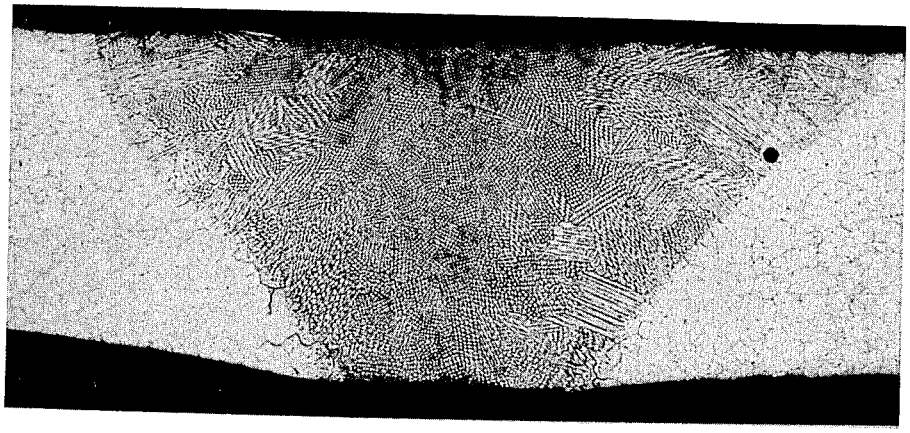
FIG. 5 is a photomicrograph at 25 times magnification showing a weld obtained using the current indicated in FIG. 4.
Figure 6:
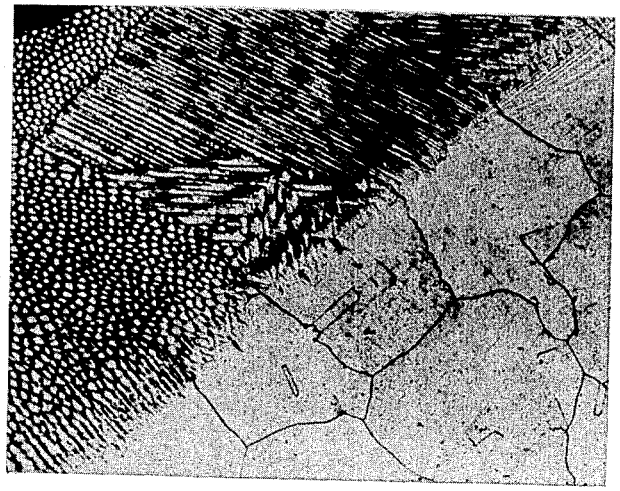
FIG. 6 is a photomicrograph at 100 times magnification showing part of the weld obtained using the current indicated in FIG. 4.

This type of thing is considered to be particularly apparent from an examination of FIGS. 5 and 6 of the drawings. In those cases where the metal welded does not have a pronounced domain type of structure the needle-like or rod-like structures produced in practicing the present invention do not appear to be limited in their orientation adjacent to the fringes of the weld area by the inherent character of the metal welded. However, even in these fringe areas in such metals adjacent to the limits of melting during welding these needle-like or rod-like structures tend to extend outwardly from the unmelted material so that they are substantially more or less transverse to the direction of the welding electrode movement.

Thus, to a substantial degree they extend in these fringe areas substantially in planes perpendicular to the direction of the electrode movement from the surfaces of the unmelted material. However, these needle-like structures tend to blend and curve adjacent to the center of a weld area where the greatest heat was applied so as to extend substantially parallel to the direction of the electrode movement in this center most region of the weld area with metals and alloys having various types of physical structures prior to being melted and solidified in accordance with the invention.

The reasons as to why metal structures as described are achieved with the present invention are not completely known and/or understood. It is believed that these reasons pertain to the fact that the resonance of the molten metal in a weld area tends to form the needle or rod-like structures indicated and to orientate these structures more or less like small particles of a powder are orientated on a resonanting tone bar. The orientation created by this mechanical resonance is apparently maintained in the molten metal as the metal cools through the continued application of the current necessary to establish and maintain this resonance. It is considered necessary that the resonance established through the use of a welding current be continued as the metal solidifies in order to obtain the results of the invention.

These results are considered to be quite significant. Those skilled in the welding industry will realize this significance from a consideration of the materials which were utilized in creating the welds shown in FIGS. 3, 4, 5 and 6. The present invention has made it possible to satisfactorily weld together various metals and alloys which previously have been classified as "hard to weld" or "impossible to weld."

No effort is being made in this specification to completely enumerate all of such metals and metal alloys which can be satisfactorily utilized with the invention. It is presumed that the invention cannot be utilized with some metals and metal alloys. At the present time, however, such metals and metal alloys have not been identified.

With various different metals and metal alloys the precise metal structures obtained in weld areas will differ slightly in the same manner in which there is some difference in the metal structures illustrated in FIGS. 3, 4, 5 and 6. It is presently believed, however, that all internal metal structures created in accordance with the invention have essentially the same type of physical characteristics indicated in this specification.

It is not to be assumed from the preceding that the invention has utility solely in welding metals which have previously been difficult, hard or substantially impossible to weld using arc welding techniques. The invention is also significant in that the welds created with it are normally of much higher strength than one would expect on the basis of existing knowledge in the welding field. Indeed, on occasion the invention has produced welds of greater physical strength than the physical strength of the metal or alloy entering into the weld. Thus, on occasion plates have been welded in accordance with the invention and the weld areas have been stronger than the plates. It is believed that the reasons for this pertain to the metal structures created.

Because of the uniqueness of the type of internal metal structure created in accordance with this invention, the invention in a broad sense obviously has application to improving the internal structures within metals and metal alloys in rods, sheets or the like of such materials. Such improvement can be achieved by moving an arc utilizing a current as indicated along the length of such a metal member. It is considered that such improvement can also be achieved by what may be classified as "refining" type operations duplicating the essential steps of a welding operation as herein indicated, but melting through a plurality of arcs a metal member so as to first place such a member in the liquid form and then allowing it to solidify while mechanical resonance as described is sustained.

Figure 7:
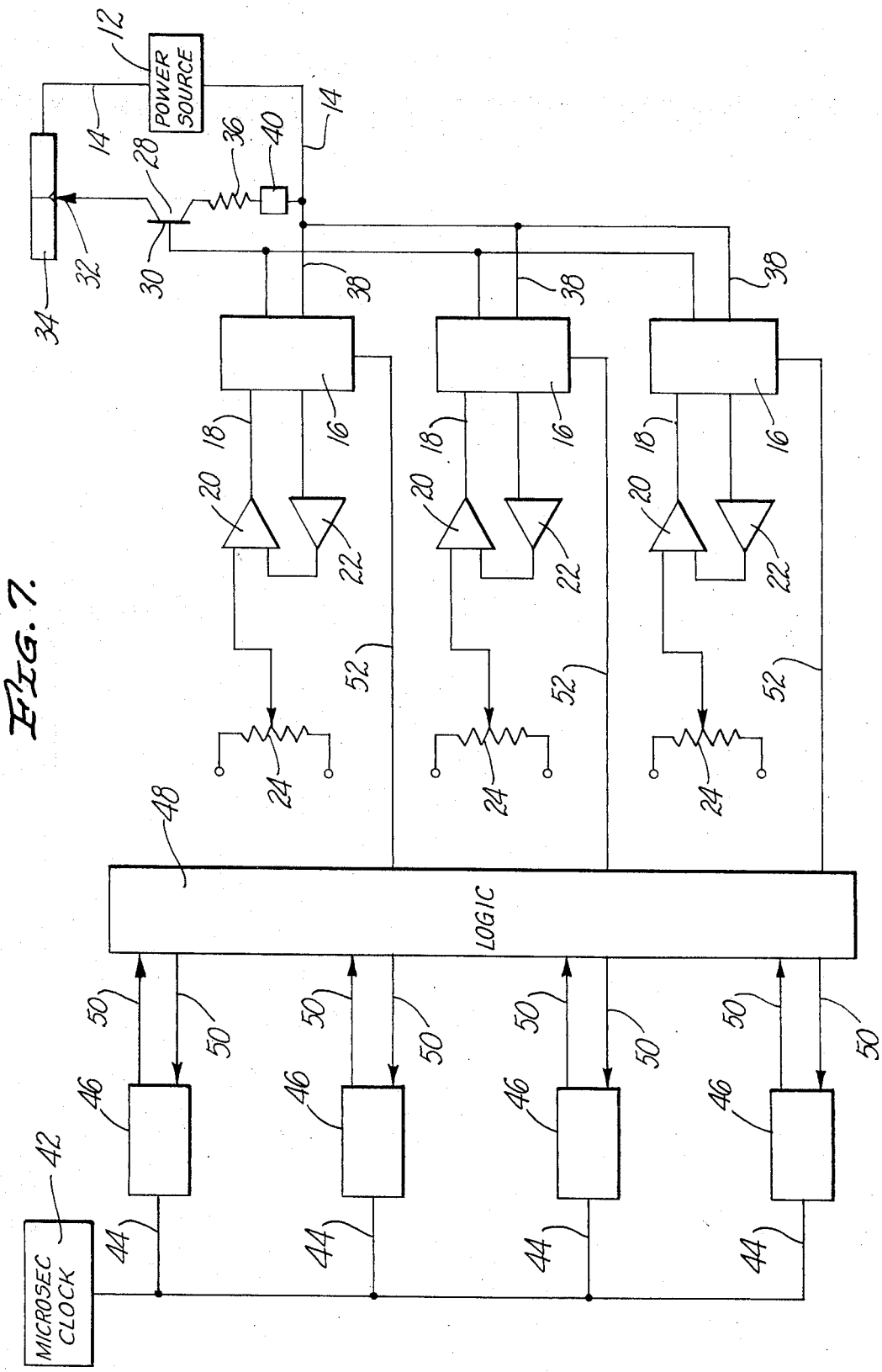
FIG. 7 is a schematic view of the circuit used to supply the current indicated in FIGS. 1 and 4.

In obtaining the results of the invention indicated in the preceding discussion a power supply circuit 10 as indicated in FIG. 7 has been utilized in order to obtain welding currents as described. This particular power supply circuit 10 is considered to be particularly advantageous in that it can be utilized with conventional welding cables and the like to supply at a welding electrode a welding current having a wave form as indicated.

With the circuit 10 shown in FIG. 7 a single power supply 12 is utilized to supply current through connections 14 to a series of three electronic switches 16, each of which is capable of being operated by an electric signal so as to pass a current increment. These switches 16 are connected by appropriate connections 18 to operational amplifiers 20 and 22 which constitute a current control feed-back network. Each of the amplifiers 20 is connected to a current reference source 24 which is used to supply a current of one of the amplitudes used in welding as described to the amplifiers 20 so that these amplifiers 20 and 22 will govern the operation of the switches 16 so that these switches 16 will only pass currents of the amplitudes indicated by the reference source 24.

When these currents are passed by the switches 16 they are conveyed by conventional connections 26 to the base of a transistor 28. The collector of this transistor 28 is directly connected to a welding cable 30 which supplies an electrode 32 used to establish an arc at one or more metal members 34. These metal members 34 are connected back to the power supply 12 in order to complete the circuit. In the circuit 10 the emitter of the transistor 28 is connected through a small resistor 36 by appropriate connections 38 back to the reference sources 24 in order to supply power to these reference sources 24. A small shunt 40 is located so as to be connected between the resistor 36 and the connections 18.

The individual switches 16 are operated through what may be considered as an electronic clock 42 which supplies through appropriate connections 44 a "beep-like" electronic signal to a series of electronic timing devices 46 which are set so as to count individual time increments as are involved in currents as illustrated in FIGS. 1 and 4. These timing devices 46 are connected to a logic network 48 by means of other connections 50 so that they will supply signals to the network 48 for desired time increments and then will be reset so as to again become operative to indicate a time interval. This logic network 48 is connected by appropriate connections 52 to the individual switches 16 so as to operate them in a desired sequence and at desired time intervals so that they will pass currents of the amplitudes used to the transistor 28 and the electrode 32. Thus, in effect with the structure described the final, ultimate welding current is a composite of individual current increments passed by the switches 16.

The complete details of the circuit 10 have not been given in this specification since it is considered that those individuals skilled in the art of electronic circuits of the type described will be able to duplicate the circuit 10 on the basis of components available to them through the use of what is now routine skill in the electronics field. It is considered that such individuals will be able to provide other circuits than the particular circuit 10 which will be operative to supply complete currents as utilized with the invention.

The components employed in the circuit 10 are all conventional or conventional type components, and are all utilized so as to achieve their normal, individual functions. It is considered, however, unique and inventive to use these components in combination as described so as to drive a current to the electrode such as the electrode 32 through the use of a transistor such as the transistor 28 in the manner indicated.

It will be recognized that conventional components as are used in the circuit 10 are capable of being adjusted so that a particular welding current utilized can be varied in such a manner as to achieve the mechanical resonance indicated in the preceding discussion. The precise current necessary to create such resonance will vary from application to application depending upon a number of factors.

It is considered that the metals being welded are quite important in determining what specific current is required to obtain this resonance. Other factors such as the geometry of the parts and structures used in welding are also critical in deriving a desired current. Such things as the dimensions of the welding electrode used, the shape and configuration of parts welded and the like all influence what is proper welding current necessary to achieve the results of the invention. Because such currents vary from application to application it is necessary that the circuit 10 be adjustable in character.

I claim:

1. In a process of welding in which an arc is established between an electrode and a weld area and is moved along the length of said weld area so as to cause metal to be melted by the application of said arc to said weld area and in which the molten metal cools so as to solidify as the arc is moved away from it, in which the improvement comprises:
    resonating the molten metal within said weld area by applying a current consisting essentially of repetitive square wave current pulses to sustain said arc and so as to cause said molten metal to resonate as it is in the molten form and as it is solidified, said current pulses in said current being applied at a rate effective to cause said resonance.

2. A process as claimed in claim 1 wherein:
    said current consists of a repetitive, sequential series of current units composed of two different series of sequential current pulses, the first of such units consisting of a series of pulses of substantially a square wave form varying between first and second current levels in amplitude, the second of such units consisting of a series of current pulses of a substantially square wave form varying between said second or a third current level and a fourth current level in amplitude.

3. A process as claimed in claim 2 wherein:
said second mentioned series of current pulses varies in amplitude between said second and said fourth current levels.

4. A process as claimed in claim 2 wherein:
there are from about 50 to about 500 of said units per second and the frequency of said pulses is from about 5,000 to about 50,000 cycles per second.

5. A process of welding in which an electric current is used to establish an arc between an electrode and a weld area and is moved with respect to the weld area so as to cause metal in said weld area to be melted by the application of said arc to said weld area and in which the melted metal is cooled as the arc is withdrawn from it so as to be allowed to solidify in which the improvement comprises:

using a current consisting of repetitive, substantially square wave current pulses to maintain said arc and to concurrently resonate the metal which has been melted by said arc as it solidifies, the frequency of said pulses being such as to cause said resonance.

* * * * *